June 13, 1933.   C. W. ARMBRUST   1,914,229
BRAKE SHOE CASTING
Filed Dec. 21, 1931
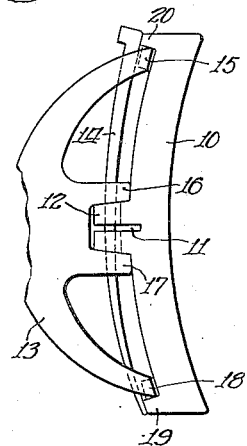
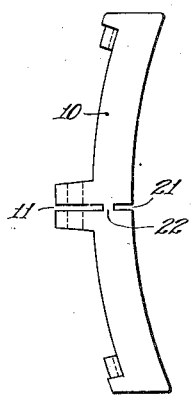
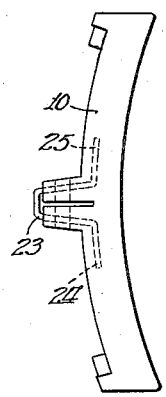
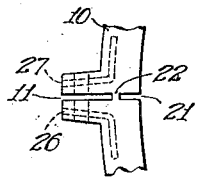
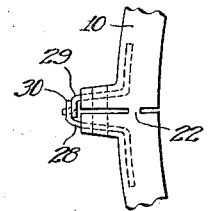
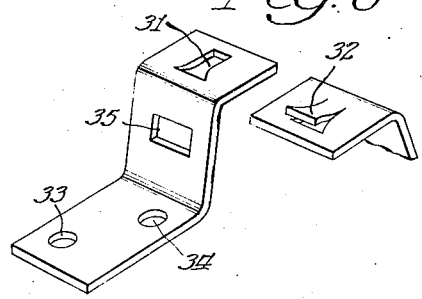
Inventor
Charles W. Armbrust Patented June 13, 1933

1,914,229

UNITED STATES PATENT OFFICE

CHARLES W. ARMBRUST, OF MIDDLETOWN, NEW YORK

BRAKE SHOE CASTING

Application filed December 21, 1931. Serial No. 582,270.

My invention relates to brake shoes for railway cars and the like and more particularly to cast iron brake shoes although it is not limited to this particular material but may be made of any other suitable material.

Ordinary integral brake shoes usually are mounted to the brake head by their central holding lug much the same as the shoe shown in Fig. 1, the pin locking into the brake head acting as a fulcrum at the central holding lug. When the brake is first applied, the shoe stands slightly away from the end prongs of the brake head at one end thereof and also slightly away from the central prongs of the brake shaft on the same half of the shoe. This results in an unnatural strain on the shoe so as to frequently cause the shoe to break between its central holding lugs and the end lugs long before the shoe is worn out thus never allowing a shoe to wear to more than about one-half the thickness. This unnatural strain often causes brake heads to break in service and also causes unnatural wear on some of the prongs of the brake head and on the parts to which the brake head is attached. The result is very often shown by an uneven wearing of the brake shoe so that one half of it wears faster than the other half thus increasing the scrap or unworn portions of the shoe when they must be discarded. It also causes unnatural wear at points on the parts to which the shoe is attached, causing also the brake heads, brake beams, etc., to be discarded and replaced more frequently.

It is the principal purpose of this invention to provide a simple type of shoe which substantially avoids the unnatural strain above referred to and causes a more even distribution of the strain than would otherwise be obtained and which will allow plain cast iron shoes to wear practically all out without steel reinforcement except possibly at the central holding lugs.

It is also a purpose of this invention to provide a shoe of this character which in shipping and attaching and any initial use is merely a one-piece shoe but which becomes after use or during use a two-piece shoe capable of adjusting itself to the brake head so as to avoid unnatural strain.

I will describe the preferred form of my invention by reference to the accompanying drawing wherein—

Fig. 1 is a side view illustrating the brake shoe as mounted on a brake head;

Fig. 2 is a side view of a brake shoe slightly modified over that shown in Fig. 1;

Fig. 3 illustrates a further modification in which steel reenforcing is used;

Figs. 4 and 5 illustrate further modifications in steel reenforcing; and

Fig. 6 is an enlarged detail view showing the manner of connecting the reforcing used in Fig. 5.

Referring now in detail to the drawing, I show in Fig. 1 a plain cast iron integral brake shoe 10 split in molding tranversely at its center as indicated at 11 through the holding lug 12 and down into the body of the shoe a little less than half way. This shoe as shown is to be mounted on the brake head 13 by means of a pin 14 and the prongs 15, 16, 17, and 18 of the brake head cooperating with the central holding lug 12 and the end lugs 19 and 20. The holding lug 12 is apertured longitudinally of the shoe to receive the brake pin 14.

In Fig. 2, the shoe 10 is just the same as in Fig. 1 with the exception that opposite the slot 11 which is molded therein there is molded a second slot 21 leaving a small web 22 holding the two end sections of the shoe together.

The construction of the shoe shown in Fig. 1 enables it to be about one-half worn out as a single shoe which is during the greatest strength when there is no danger of its breaking. After this, the shoe breaks in line with the slot 11 into a two-piece shoe enabling the upper and lower sections to rest evenly against the outer end prongs and the central prongs of the standard brake head so that all strain when the engineer applies the brakes will be evenly distributed against the brake head. This enables the brake shoe to be practically worn out before it will break due to the strain thereof.

The modified construction in Fig. 2 shows the shoe as divided centrally downward from the top of its holding lug and inwardly from its face leaving a slight intervening section 22 solid throughout the width of the shoe. Preferably the solid portion is deeply scored on both sides of the shoe making it break easily and evenly at this line. This construction results in a two-piece shoe which can be handled at a single piece during transportation and during its mounting on the brake head; however, it breaks into the two-piece shoe as soon as the engineer applies his brakes a few times.

Both of the shoes shown in Figs. 1 and 2 have the advantage that as soon as they split into a two-piece shoe they relieve the unnatural strain referred to in the first part of this specification and permit both pieces of the shoe to settle back smoothly against the prongs of the brake head. The shoe shown in Fig. 2 is the better because it becomes a two-piece shoe before being worn to any great extent and is thus much safer.

In Fig. 3, the only change made is to add to the shoe shown in Fig. 1 a soft steel holding lug 23 cast into the back of the shoe and into the central holding lugs of the shoe for greater safety. This attaches the two sections of the shoe 10 together even after they are broken although it permits them to adjust themselves to the brake head. It is obvious that the steel holding lug may have the lower portions 24 and 25 thereof extended to form a steel reenforcement along the back of the shoe.

In Fig. 4, I show another type of reenforcement where the soft steel lugs 26 and 27 are wholly embedded in the central lug sections of the shoe and extend down into the body of the shoe. In this shoe, when the web at 22 breaks, the two halves of the shoe are entirely separated. However, the steel reenforcing makes for a greater safety and strength in the central holding lug which avoids the danger of their breaking off.

In Figs. 5 and 6, the shoe 10 has the steel reenforcing lugs 28 and 29 which overlap as indicated at 30. One of these lugs has a keyway 31 therein, and the other has a tongue 32 which is struck up to pass through the keyway 31 so as to lock the two halves of the shoe together so that they may be handled as one piece although they are free to adjust themselves on the brake head after the web 22 breaks. In all of these reenforcements such as 23 and 26-29, the steel is preferably cast right into the iron and suitable holes such as indicated at 33 and 34 are punched in the holding lug to allow the molten metal to run through them thus tying the casting and steel holding lugs firmly together. The openings 35 are for the keyway to receive the pin 14 to lock the shoes to the brake head.

From the above description, it is believed that the construction and advantages of this device will be clear to those skilled in this art.

Having thus described my invention, what I claim as new and desire to secure by Letters Patent is:

1. A brake shoe having a holding lug and being split transversely at its center through the holding lug, and also split transversely at its center on its concave face, leaving a small interconnecting web between the two adjacent portions of the brake shoe casting.

2. A brake shoe having a holding lug and being split transversely at its center through the holding lug and down into the body of the brake shoe a substantial distance, and an interconnecting reenforcing web across the back of said lug and connecting the adjacent sides of said transverse split.

3. A brake shoe having a holding lug and being split transversely at its center through the holding lug and down into the body of the brake shoe, and a connecting web molded in said brake shoe and connecting across the back of said holding lug.

4. A brake shoe having a holding lug and being split transversely at its center through the holding lug, and split transversely at its center on the concave surface, being interconnected by a web strip between said two splits, and steel reenforcing means extending through said lug and into the shoe portion preventing breaking elsewhere than the interconnecting web strip.

5. A brake shoe having a holding lug and being split transversely at its center, the sides adjacent said split being interconnected by a web strip, and reenforcing means in each adjacent shoe portion on both sides of said transverse split, said reenforcing means on one side of said split extending from the shoe portion up through the holding lug and interconnecting with the similar reenforcing means from the other side of the split, over the split at the back of the holding lug.

6. A brake shoe having a holding lug and being slotted transversely at its center through the holding lug and down a substantial distance into the body of the shoe, the slot in the shoe providing a point where the wear on the face of the shoe will first weaken the shoe so that it breaks under the strain applied thereto in use.

In witness whereof, I hereunto subscribe my name this 4th day of December, A. D., 1931.

CHARLES W. ARMBRUST.